United States Patent [19]

Johnson

[11] Patent Number: 4,835,613
[45] Date of Patent: May 30, 1989

[54] TRANSITION STATUS DISPLAY FOR VIDEO SWITCHER

[75] Inventor: Brion Johnson, Nevada City, Calif.

[73] Assignee: The Grass Valley Group, Inc., Grass Valley, Calif.

[21] Appl. No.: 179,154

[22] Filed: Apr. 8, 1988

[51] Int. Cl.[4] .......................... H04N 9/74; H04N 5/14; H04N 5/268; H04N 5/272
[52] U.S. Cl. .................................... 358/181; 358/160; 358/183; 358/22; 360/14.1
[58] Field of Search ................ 358/160, 181, 182, 183, 358/22, 311; 360/14.1

[56] References Cited

U.S. PATENT DOCUMENTS

| | | | |
|---|---|---|---|
| 4,667,221 | 5/1987 | Cawley et al. | 358/183 |
| 4,694,329 | 9/1987 | Belmares-Sarabia et al. | 358/22 |
| 4,694,343 | 9/1987 | Flora | 358/183 |
| 4,698,664 | 10/1987 | Nichols et al. | 358/311 |
| 4,700,230 | 10/1987 | Pshtissky et al. | 358/181 |
| 4,729,028 | 3/1988 | Miui et al. | 358/183 |

Primary Examiner—James J. Groody
Assistant Examiner—John K. Peng
Attorney, Agent, or Firm—Francis I. Gray

[57] ABSTRACT

A transition status display for a video switcher inserts a single, readable synopsis of a next transition event into a video output signal from the video switcher for display on a monitor. The synopsis is in the form of a window having a line segment representing a time line between a prior transition event and the next transition event, the type of the next transition event being indicated graphically. Various tic marks represent significant events in time from an initial tic mark representing the time of the prior transition through a final tic mark representing completion of the next transition. Appropriate alpha-numeric characters are provided with the line segment to label the significant events, to identify the current and next video sources, and to provide time information, the time information being constantly updated together with an analog marker which moves along the line segment as time progresses toward the next transition.

2 Claims, 6 Drawing Sheets

TRANSITION STATUS DISPLAY FOR VIDEO SWITCHER

BACKGROUND OF THE INVENTION

The present invention relates to video displays, and more particularly to a transition status display for a video switcher to provide a visual synopsis to an operator of the next transition to be performed by the video switcher.

In the television world various video input sources provide picture images for input to a video switcher which then switches to the output for transmission or recording one of the picture images from a selected one of the input sources. The switching may be done manually in real time by an operator, but is more efficiently done by programming the switcher to perform several transitions automatically in a specific sequence with a predetermined type of transition. Transition types include cuts, fades, mixes and combinations thereof. Video input sources include cameras, receivers and video recorders. For example it may be desired to have a scene from a studio off a camera, then switch to a remote satellite feed, and then switch to a video recorder; or it may be desired to switch between several video recorders such as recorders containing program material and recorders containing commercial material. For a Master Control Switcher Model 1600-4S manufactured by the Grass Valley Group, Inc. of Grass Valley, Calif. this entails setting a lot of buttons and storing a lot of parameters for recall. It is desirable for the operator to be aware of upcoming transitions in the event that changes are required so that the operator may interrupt the automatic operation of the switcher to smoothly make the transition changes without any apparent visual discrepancies to a viewer. Although the information is available by reviewing all the button statuses and other displays on the switcher, it would be more convenient for the operator to have the necessary information summarized in a single, readable display. This is especially important during editing of program material.

SUMMARY OF THE INVENTION

Accordingly the present invention provides a transition status display for a video switcher which gives an operator a single, readable synopsis for an upcoming video transition. A status display circuit is inserted in a video feed path between the video switcher and a monitor. The status display circuit is coupled to a microprocessor via a bus over which status display information from the video switcher is provided to the status display circuit in an appropriate format together with a status key signal. The status display circuit inserts the status display information into the video signal in the video feed path using the status key signal, the modified video signal being output to the monitor. The status information is presented in a combination of alpha-numeric information and graphical information in a condensed window format within the video signal.

The objects, advantages and other novel features of the present invention are apparent from the following detailed description when read in conjunction with the appended claims and attached drawing.

DESCRIPTION OF THE PREFERRED EMBODIMENT

Figure 1:
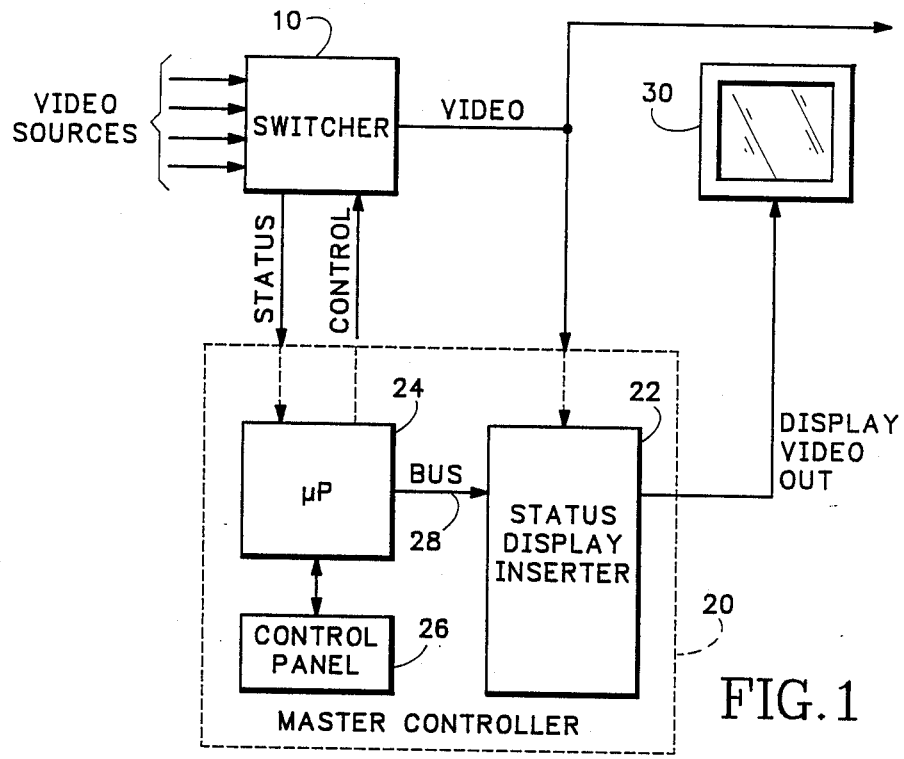
FIG. 1 is a block diagram of a master controller for a video switcher according to the present invention.

Referring now to FIG. 1 a production video switcher 10 is shown having a plurality of video input sources and a video output. The video output is input to a master controller 20 together with status information from the switcher 10. The master controller 20 provides control signals to the switcher 10 to govern the set up of the switcher. A display video output from the master controller 20 is input to a monitor 30 which is readily accessible to an operator working at the switcher 10. Although shown as a separate piece of equipment, the master controller 20 may be incorporated into the switcher 10.

Within the master controller 20 is a status display circuit 22 to which is applied the video output from the switcher 10 and from which is obtained the display video output. A microprocessor 24 receives the status information from the switcher and operator inputs from a control panel 26. The status information is processed by the microprocessor 24 and output over a bus 28 with an appropriate status key signal to the status display circuit 22 for insertion into the video output from the switcher 10 using the status key signal. The microprocessor 24 in response to inputs from the control panel 26 also outputs control signals to the switcher 10 to program transitions on the switcher.

The status information from the switcher 10 is in the form of switch on/off settings and parameter values. The microprocessor 24 converts these data into alpha-numeric characters according to the information represented and into an analog graphic display as shown in FIGS. 2b-2g. A transition status display window 40 is keyed over the video output from the switcher 10. Within the window 40 is a line segment 42 representing the passage of time from left to right from the last transition to the next one. An analog marker 44 indicates the time remaining until the next transition along the line segment 42, and various tic marks 46 indicate the points where significant events occur. As time elapses the analog marker 44 moves toward the right along the line segment 42. The line segment 42 is interrupted by a transition type indicator symbol 48. The alpha-numeric portion within the window indicates the present video input source prior to the transition, the video input source after the transition, and the transition phases with associated times. Once the next transition has occurred the analog marker 44 moves instantaneously to the extreme left of the line segment 42 and the next transition 48 is displayed. If no remaining time is set for the next transition 48, then the analog marker 44 becomes a stationary marker 50 which stays at the left side of the line segment 42 with elapsed time from the last transition being displayed.

Figure 2A:
FIGS. 2a-2g represent a transition from one displayed video image to another incorporating a transition status display according to the present invention.
Figure 2B:
Figure 2C:
Figure 2D:

For example as shown in FIG. 2a the current video output of the switcher is a tiger picture from a current video source. In FIG. 2b this current video source is "CAMera 3" with eleven minutes forty-one seconds remaining from the marker 44, the first tic mark 46 indicating the time of the last transition and the first heavy tic mark indicating the start of the next transition 48. The next video input source is "Video Tape Recorder 16" which pre-rolls one and six-tenths seconds prior to the transition. The transition will take four-tenths of a second and is in the form of a fade to black for the first source and a cut to the second source from black. FIGS. 2c and 2d illustrate the movement of the analog marker 44 with time along the line segment 42. During the time prior to the transition the current source CAM 3 is highlighted. At FIG. 2e the analog marker has entered the pre-roll period, i.e., the period during which the video tape recorder, which is the next video source, is started to bring it up to operating speed, and the analog marker is between the tic marks 46 indicating the start of the pre-roll and the start of the transition with PRE ROLL being highlighted. When the analog marker 44 enters the transition region of the line segment 42, both the current and the next video sources are highlighted as well as the TRAN indicator. At all points the appropriate time indicators are updated.

Figure 2E:
Figure 2F:
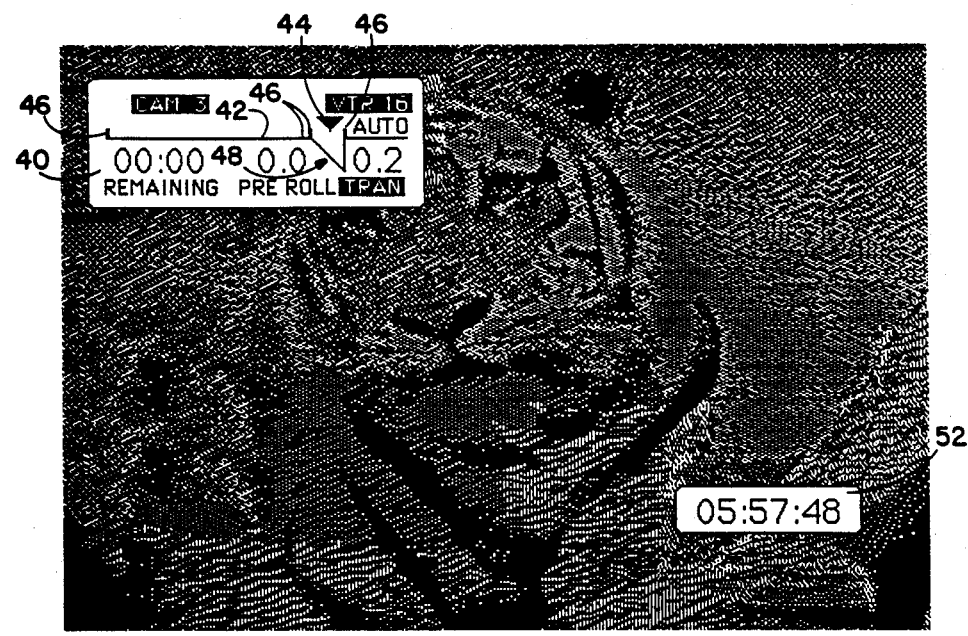
Figure 2G:
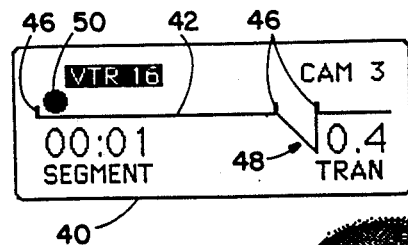

FIG. 2g displays the next picture from the video input source VTR 16 and, since no remaining time has been set, the analog marker 44 has become the stationary marker 50 and the time since the last transition is incremented. Since the next transition indicated is a return to video input source CAM 3, no pre-roll time is indicated since none is required for a video camera. Also no pre-roll would be indicated if the transition time prior to the start of displaying VTR 16 pictures is greater than the required pre-roll time. In all the FIGS. 2b–2g a second window 52 displays the current time. Also if desired a log window 54, as shown in FIG. 2g, displays the time at which the transition to the current video input source occurred until the log window is cleared by the operator.

Figure 3A:
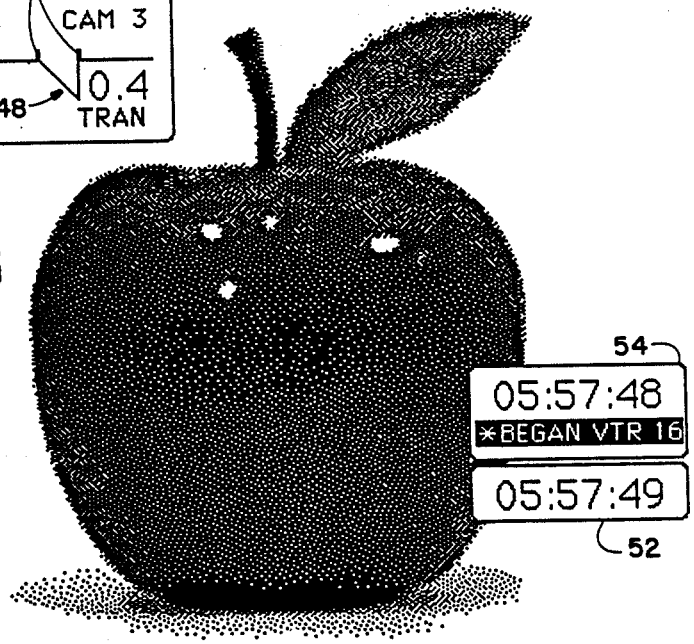
FIGS. 3a-3d represent alternate transition type indicators according to the present invention.
Figure 3A:
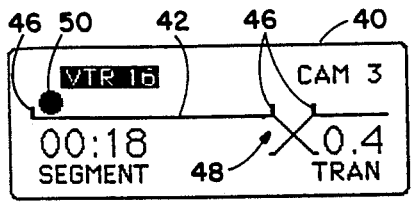
Figure 3C:
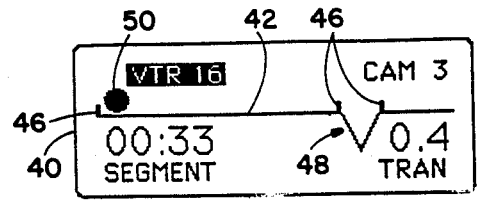
Figure 3B:
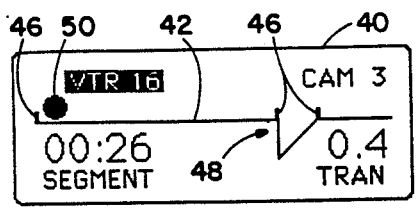
Figure 3D:
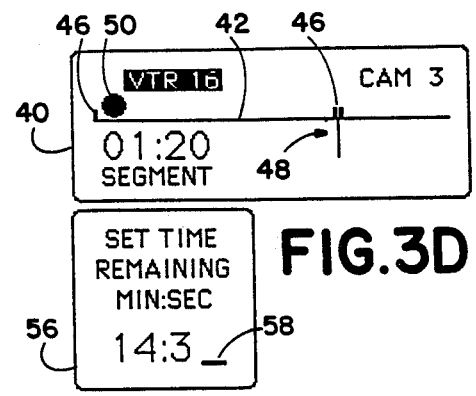

Referring now to FIGS. 3a–3d various other transition types are illustrated. In FIG. 3a a mix transition is shown, with the next video source being taken up from black at the same time as the current video input source is being taken down to black. FIG. 3b illustrates a cut to black of the current video source and a fade up from black of the next video source. FIG. 3c illustrates a fade to black of the current video source followed by a fade up from black of the next video source. Finally FIG. 3d illustrates a cut from one video source directly to the next video source. Also shown in FIG. 3d is an information entry window 56. The information entry window 56 in one field indicates the type of information to be entered and has a data entry field with a cursor 58 indicating the current position for entering the required data. In the illustration the time remaining to the next transition is being entered, with the integer second still to be entered as indicated by the cursor 58.

Figure 4:
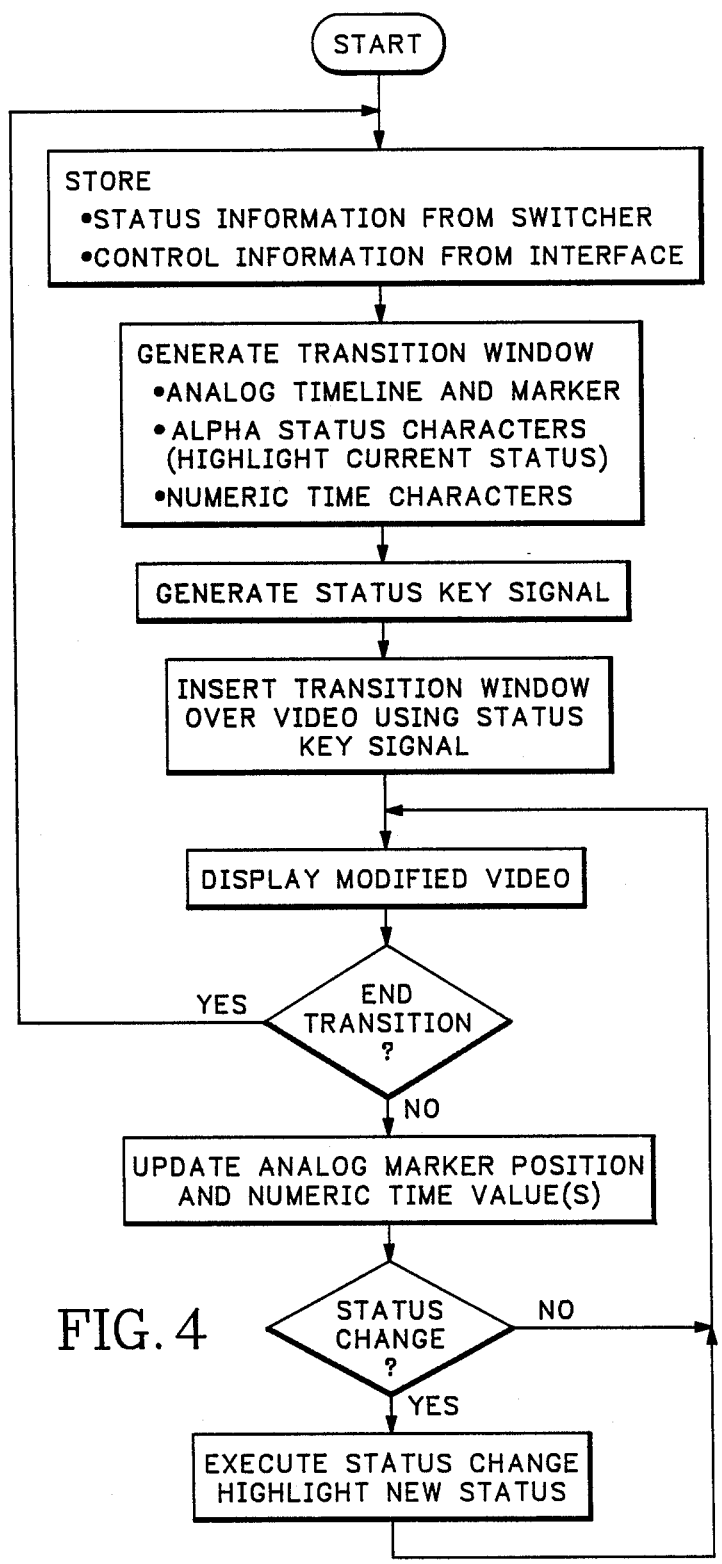
FIG. 4 is a flowchart for providing a transition status display according to the present invention.

As shown in FIG. 4 the status information from the switcher 10, together with control information from the interface 26, are received and stored by the microprocessor 24. The transition window 40 is generated by the microprocessor 24 from the status and control information for the next to occur transition, together with the status key signal, and displayed over the video picture as shown in FIG. 2b. If the transition has not been completed, the position of the analog marker 44 is updated together with the numeric time value(s) for the associated transition events and displayed as shown in FIGS. 2c and 2d. If there is a status change, then that change is executed, the new status highlighted and the analog marker and numeric time values updated as shown in FIGS. 2e and 2f. When the transition is completed, then a new transition window is generated and displayed as shown in FIG. 2g.

Thus the present invention provides a transition status display for a video switcher which provides a single, easily readable display for an operator regarding the next transition to be performed in the form of a graphic analog image with associated alpha-numeric information inserted over a video output signal from the switcher displayed on a monitor.

What is claimed is:

1. A method of displaying on a monitor transition status for a video switcher comprising the steps of:
   receiving transition status information from the video switcher;
   formatting the transition status information for insertion into a video output signal from the video switcher, the formatted transition status information being in the form of a window having an analog line segment and alpha-numeric labels;
   inserting the formatted transition status information over the video output signal using a status key signal generated according to specified parameters from a control panel to produce a display video output signal; and
   displaying the display video output signal on the monitor.

2. A method as recited in claim 1 wherein the formatting step comprises the steps of:
   generating the analog line segment with an initial tic mark representing an immediately prior transition time and with additional tic marks indicating significant events in time for a next transition, the analog line segment further including a transition type graphic indicator;
   generating an analog marker with respect to the analog line segment having a position indicating a current point in time relative to the immediately prior transition time and the next transition;
   generating alpha characters situated with respect to the analog line segment so as to label the significant events and to indicate a current video source for the video output signal and a next video source for the video output signal after the next transition;
   generating numerical characters situated with respect to the analog line segment and the alpha characters to indicate appropriate time values; and
   updating the analog marker and appropriate time values as time progresses toward the next transition.

* * * * *